(12) United States Patent
Ippatapu et al.

(10) Patent No.: US 10,817,341 B1
(45) Date of Patent: Oct. 27, 2020

(54) ADAPTIVE TUNING OF THREAD WEIGHT BASED ON PRIOR ACTIVITY OF A THREAD

(71) Applicant: EMC IP Holding Company LLC, Hopkinton, MA (US)

(72) Inventors: Venkata L. R. Ippatapu, Westborough, MA (US); Kenneth Dorman, West Brookfield, MA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 57 days.

(21) Appl. No.: 16/380,283

(22) Filed: Apr. 10, 2019

(51) Int. Cl.
  *G06F 9/455* (2018.01)
  *G06F 9/50* (2006.01)
  *G06F 9/48* (2006.01)
  *G06N 3/08* (2006.01)

(52) U.S. Cl.
  CPC .......... *G06F 9/5027* (2013.01); *G06F 9/4881* (2013.01); *G06N 3/08* (2013.01); *G06F 2209/483* (2013.01); *G06F 2209/5011* (2013.01); *G06F 2209/5018* (2013.01)

(58) Field of Classification Search
  CPC .................. G06F 9/5027; G06F 9/4881; G06F 2009/483; G06F 2009/5011; G06F 2009/5018; G06N 3/08
  USPC ........................................................ 718/104
  See application file for complete search history.

(56) References Cited

U.S. PATENT DOCUMENTS

| | | | |
|---|---|---|---|
| 2006/0117316 A1* | 6/2006 | Cismas ................. | G06F 9/3851 718/103 |
| 2009/0328055 A1* | 12/2009 | Bose ..................... | G06F 1/3203 718/105 |
| 2013/0160023 A1* | 6/2013 | Suzuki ................. | G06F 9/4887 718/104 |
| 2015/0186184 A1* | 7/2015 | Kim ..................... | G06F 9/5088 718/104 |
| 2016/0092274 A1* | 3/2016 | Singh ................... | G06F 9/5027 718/104 |
| 2020/0201671 A1* | 6/2020 | Samih ................. | G06F 9/30101 |

* cited by examiner

*Primary Examiner* — Diem K Cao
(74) *Attorney, Agent, or Firm* — Amin, Turocy & Watson, LLP (57) ABSTRACT

The described technology is generally directed towards adaptively tuning thread weights for multithreaded processors. According to an embodiment, a system can comprise a memory that can store computer executable components, and a processor that can execute the computer executable components stored in the memory. The computer executable components can comprise a thread activity analyzer to determine a first likelihood of a first thread of a multithreaded processor entering a spin mode based on analysis of previous activity of the first thread. The system can further comprise a thread weight component to assign a thread weight to the first thread based on the first likelihood, wherein a share of resources of the multithreaded processor is assigned to the first thread based on the thread weight of the first thread.

20 Claims, 10 Drawing Sheets

| Thread weight Coefficient | Current Thread Thread weight for Time Interval 'T' | New thread Thread weight for next Time Interval 'T+1' |
|---|---|---|
| PC > 1 | x | x + PC |
| PC < 1 | x | x - PC |
| PC = -1 | x | 2 * x |
| PC = 0 | x | 1 |

```
┌─────────────────────────────────────────────────────┐
│         ┌───────────────────────────────────┐       │
│         │ DETERMINE A FIRST LIKELIHOOD OF A │       │
│         │ FIRST THREAD OF A MULTITHREADED   │       │
│  802 ───│ PROCESSOR ENTERING A SPIN MODE    │       │
│         │ BASED ON ANALYSIS OF PREVIOUS     │       │
│         │ ACTIVITY OF THE FIRST THREAD      │       │
│         └───────────────────────────────────┘       │
│              THREAD ACTIVITY ANALYZER 110           │
└─────────────────────────────────────────────────────┘
                          │
                          ▼
┌─────────────────────────────────────────────────────┐
│         ┌───────────────────────────────────┐       │
│         │ ASSIGN A THREAD WEIGHT TO THE     │       │
│         │ FIRST THREAD BASED ON THE FIRST   │       │
│  804 ───│ LIKELIHOOD, WHEREIN A SHARE OF    │       │
│         │ RESOURCES OF THE MULTITHREADED    │       │
│         │ PROCESSOR IS ASSIGNED TO THE      │       │
│         │ FIRST THREAD BASED ON THE THREAD  │       │
│         │ WEIGHT OF THE FIRST THREAD        │       │
│         └───────────────────────────────────┘       │
│              THREAD WEIGHT COMPONENT 120            │
└─────────────────────────────────────────────────────┘
```

ADAPTIVE TUNING OF THREAD WEIGHT BASED ON PRIOR ACTIVITY OF A THREAD

TECHNICAL FIELD

The subject application generally relates to microprocessors, and, for example, to tuning thread execution by multithreaded processors, and related embodiments.

BACKGROUND

Multithreaded applications and multicore systems can improve the use of processor resources and utilization, offer parallelism, and increase the performance of applications of the system. As technology develops, the use of multithreaded and multicore systems is increasing, e.g., the use of graphical processing units (GPUs) been increasing, and these processors have extensive resources and hundreds of cores available systems for their applications.

Problems can occur however, and performance may suffer, when application threads overutilize or underutilize processor resources, especially when there are multiple threads contending on limited number of cores.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

According to an embodiment, a system can comprise a memory that stores computer executable components and a processor that can execute the computer executable components stored in the memory. The computer executable components comprise a thread activity analyzer to determine a first likelihood of a first thread of a multithreaded processor entering a spin mode based on analysis of previous activity of the first thread. The system can further comprise a thread weight component to assign a thread weight to the first thread based on the first likelihood, wherein a share of resources of the multithreaded processor is assigned to the first thread based on the thread weight of the first thread.

According to another embodiment, a computer-implemented method can comprise receiving, by a scheduling process executed by a processor for multithreaded processor, a thread weight assigned to a thread of a pool of threads, wherein the thread weight is based on a likelihood, determined based on an analysis of previous activity of the first thread, that the thread will enter a spin mode. The method can further comprise scheduling, by the scheduling process, the thread of the pool of threads for execution by the multithreaded processor, based on the thread weight.

According to another embodiment, a computer program product is provided. The computer program product can comprise machine-readable storage medium comprising executable instructions that, when executed by a processor, facilitate performance of operations comprising determining a likelihood of a thread of a multithreaded processor entering a spin mode based on analysis of previous activity of the thread. The operations can further comprise assigning a thread weight to first thread based on the likelihood, wherein a share of resources of the multithreaded processor is assigned to the thread based on the thread weight of the thread.

Other embodiments may become apparent from the following detailed description when taken in conjunction with the drawings.

BRIEF DESCRIPTION OF THE DRAWINGS

The technology described herein is illustrated by way of example and not limited in the accompanying figures in which like reference numerals indicate similar elements, and in which.

DETAILED DESCRIPTION

Various aspects described herein are generally directed towards facilitating the adaptive tuning of thread weights for multithreaded processors. As will be understood, the implementation(s) described herein are non-limiting examples, and variations to the technology can be implemented.

Reference throughout this specification to "one embodiment," "an embodiment," "one implementation," "an implementation," etc. means that a particular feature, structure, or characteristic described in connection with the embodiment/implementation is included in at least one embodiment/implementation. Thus, the appearances of such a phrase "in one embodiment," "in an implementation," etc. in various places throughout this specification are not necessarily all referring to the same embodiment/implementation. Furthermore, the particular features, structures, or characteristics may be combined in any suitable manner in one or more embodiments/implementations.

Aspects of the subject disclosure will now be described more fully hereinafter with reference to the accompanying drawings in which example components, graphs and operations are shown. In the following description, for purposes of explanation, numerous specific details are set forth in order to provide a thorough understanding of the various embodiments. However, the subject disclosure may be embodied in many different forms and should not be construed as limited to the examples set forth herein.

Figure 1:
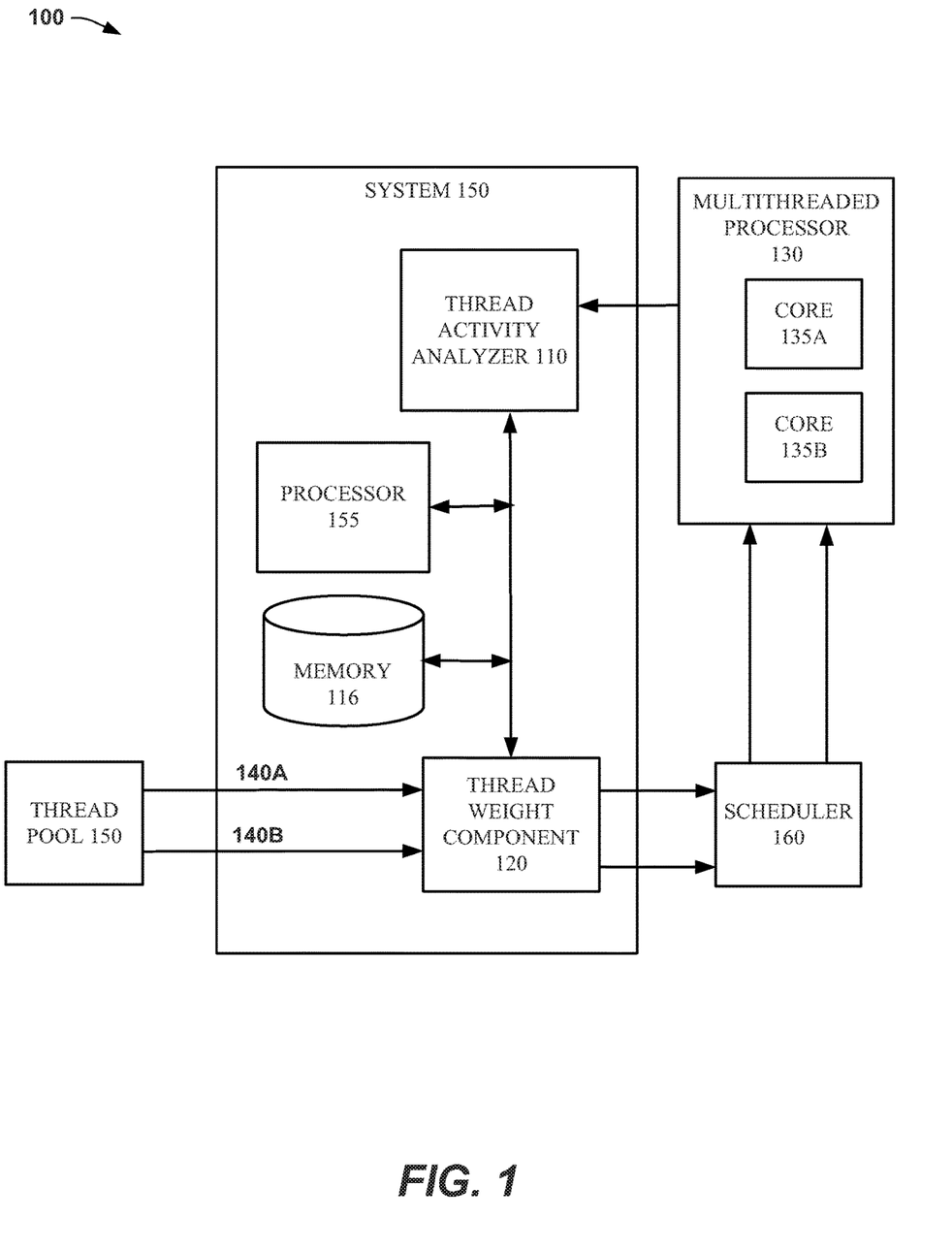
FIG. 1 illustrates a block diagram of an example, non-limiting system that can facilitate the adaptive tuning of thread weights for multithreaded processors, in accordance with various aspects and implementations of the subject disclosure.

FIG. 1 illustrates a block diagram 100 of an example, non-limiting system 150 that can facilitate the adaptive tuning of thread weights for multithreaded processors, in accordance with various aspects and implementations of the subject disclosure.

In one or more embodiments, system 150 accesses threads 140A-B of thread pool 152 and, based on approaches described herein, assigns weights to the threads that are used by scheduler 160 to schedule times for the threads to be executed by cores 135A-B of multithreaded processor 130. In some embodiments, processor 155 and multithreaded processor 130 can comprise one or more of a central processing unit, multi-core processor, microprocessor, dual microprocessors, microcontroller, System on a Chip (SOC), array processor, vector processor, and/or another type of processor. Further examples of processor 155 and multithreaded processor 130 are described below with reference to processing unit 1014 and FIG. 10. Such examples can be employed with any embodiments of the subject disclosure.

As discussed further below with FIG. 10, in some embodiments, memory 116 can comprise volatile memory (e.g., random access memory (RAM), static RAM (SRAM), dynamic RAM (DRAM), etc.) and/or non-volatile memory (e.g., read only memory (ROM), programmable ROM (PROM), electrically programmable ROM (EPROM), electrically erasable programmable ROM (EEPROM), etc.) that can employ one or more memory architectures. Further examples of memory 116 are described below with reference to system memory 1016 and FIG. 10. Such examples of memory 116 can be employed to implement any embodiments of the subject disclosure.

According to multiple embodiments, processor 155 can comprise one or more types of processors and/or electronic circuitry that can implement one or more computer and/or machine readable, writable, and/or executable components and/or instructions that can be stored on memory 116. For example, processor 155 can perform various operations that can be specified by such computer and/or machine readable, writable, and/or executable components and/or instructions including, but not limited to, logic, control, input/output (I/O), arithmetic, and/or the like.

In one or more embodiments, processor 155 can execute components including thread activity analyzer 110 and thread weight component 120. By processes described in more detail below, thread activity analyzer 110 can determine a likelihood of a threads 140A-B of system 150 entering a spin mode based on analysis of previous activity of thread 140A-B, e.g., previous activity data stored in memory 116. Thread weight component 120 can assign weights to threads 140A-B based on the first likelihood and a first share of resources of the multithreaded processor 130 can be assigned by scheduler 160 to threads 140A-B based on respective weights of the threads. It should be noted that, the approaches described herein can also be extended or generalized to any scheduler to adaptively tune several metrics for optimizing the usage of CPU resources and improving the overall performance of the system.

Figure 2:
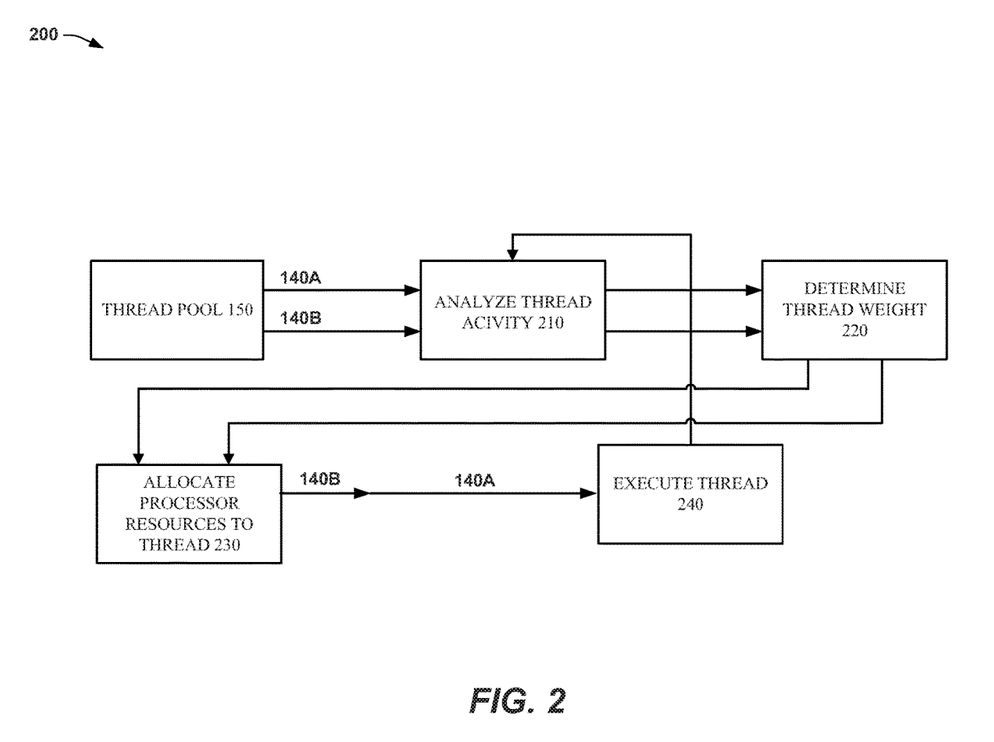
FIG. 2 illustrates a flow diagram of example processes that can facilitate the adaptive tuning of thread weights for multithreaded processors, in accordance with one or more embodiments.

FIG. 2 illustrates a flow diagram 200 of example processes that can facilitate the adaptive tuning of thread weights for multithreaded processors, in accordance with one or more embodiments. For purposes of brevity, description of like elements and/or processes employed in other embodiments is omitted.

From FIG. 1, thread pool 152 has threads 140A-B available for scheduling. At block 210, the previous activity of threads 140A-B is analyzed, e.g., by thread activity analyzer 110.

One approach to analyzing thread activity used by different embodiments described herein, uses the occurrence of different events during execution of the thread. In one example, these occurrences detected and analyzed during intervals during the execution by the thread of a particular thread task. In another approach, the analysis and weighting described herein can be performed at the completion of a particular thread task. Additional description and examples of these events and weighting times are described further below, e.g., with FIG. 4.

In some circumstances addressed by one or more embodiments, CPU resources can be wasted if less busy threads are assigned high thread weight and if heavy workload threads are assigned lower thread weights. Other approaches do not adaptively tune thread weights and can these approaches can, in some circumstances reduce overall system performance by not providing enough CPU resources to the needed threads at any given time.

One example analysis that can be performed on threads to facilitate adaptive weighting comprises estimating a likelihood that the threads, when executed, will enter a spin state or a yield state. As used in the description of some embodiments herein, a spin state is a state where the thread continues to work on the tasks of the thread. A yield state can correspond to a state where the thread is waiting to execute, e.g., yielding to other threads. Example approaches that can be used to determine the likelihood that the threads, when executed, will enter a spin state or a yield state are discussed below with FIG. 4. The results of the analysis by block 210 are used by block 220, described below.

At block 220, a thread weight can be determined (e.g., by thread weight component 120) based at least in part on the analysis of thread activity in block 210. In some circumstances, thread weight can factor into the performance of an application, as well as overall system performance. One or more embodiments can allocate weights to promote a good balance of thread weights between application threads, e.g., to improve the overall system performance as compared to other approaches. In an example, thread 140A is weighted a 3, and thread 140B is weighted a 1.

Once determined, a thread weight can be used in block 230 to allocate resources (e.g., by scheduler 160) to threads for execution. Examples of this allocation of resources is described further below with FIG. 3. Once resources have been allocated at block 230, threads 140A-B can be executed 240 based on the allocated resources, e.g., by cores 135A-B of multithreaded processor 130.

Figure 3:
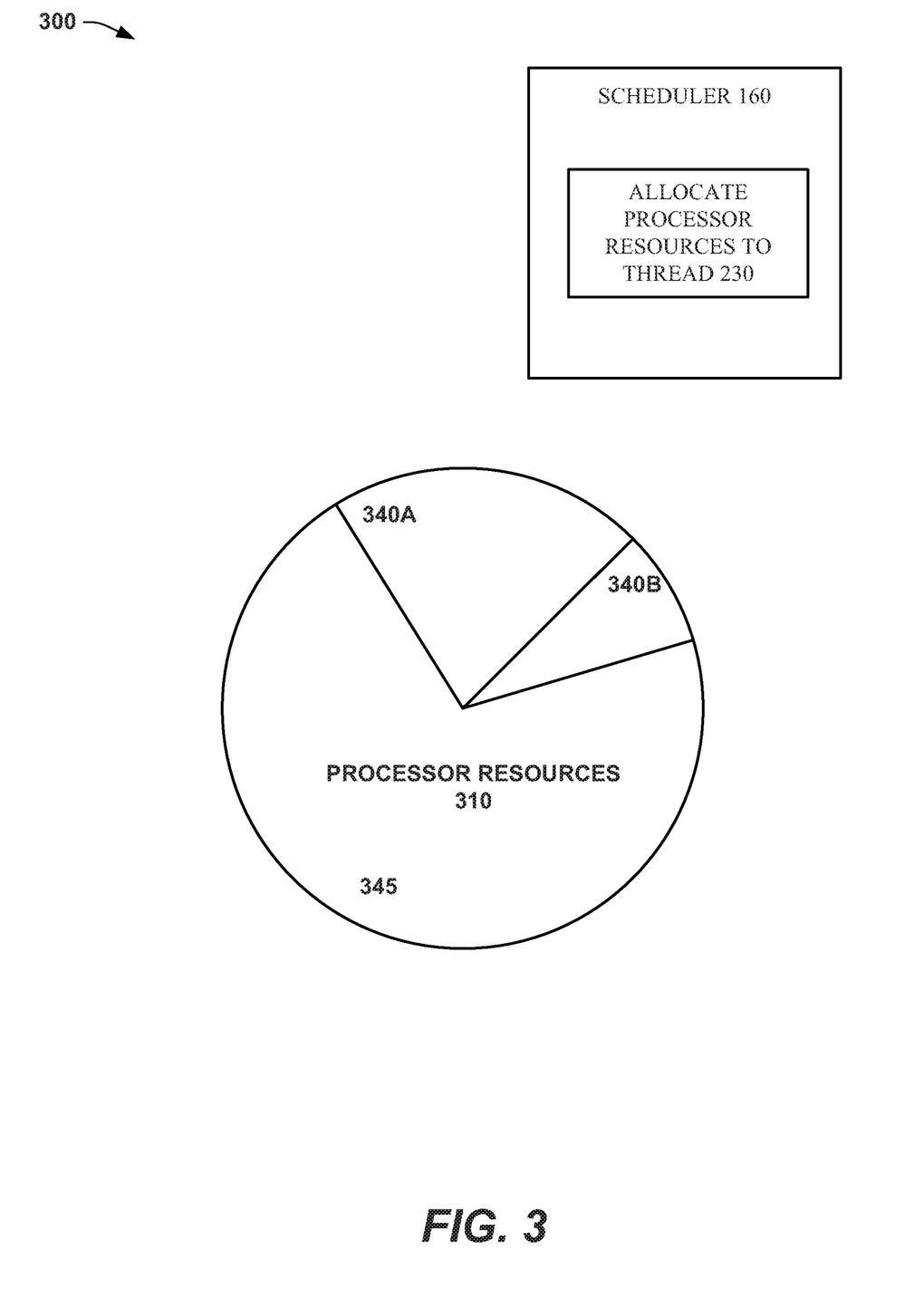
FIG. 3 depicts a chart that shows resources allocated to threads, in accordance with one or more embodiments described herein.

FIG. 3 depicts a chart that shows resources 300 allocated to threads 140A-B, in accordance with one or more embodiments described herein. For purposes of brevity, description of like elements and/or processes employed in other embodiments is omitted.

As noted above, scheduler 160 can perform operations described in block 230 above, e.g., allocating processor resources 310 to threads 140A-B. Returning to the example above, based on the assigned weight of 3, thread 140A is allocated a larger share 340A of processor resources 310 than the share 340B for thread 140B, with weight of 1, and share 345 being dedicated to other threads (not shown).

In one or more embodiments, the resources allocated based on the thread weight can correspond to a number of times a thread is scheduled by scheduler 160. In an example implementation, scheduler 160 can traverse a run list of threads. In an example, when a thread has thread weight of 3, this can cause the thread to be scheduled for execution to be processed 3 times every time scheduler 160 traverses the run list of the threads. In one or more embodiments, this can be beneficial because the resources assigned to the thread with a weight of 3, e.g., the thread with a weight of 3 can have 3 times more CPU resources allocated thereto than a thread with thread weight of 1. Other approaches to allocating processor resources can be used by one or more embodiments.

Figure 4:
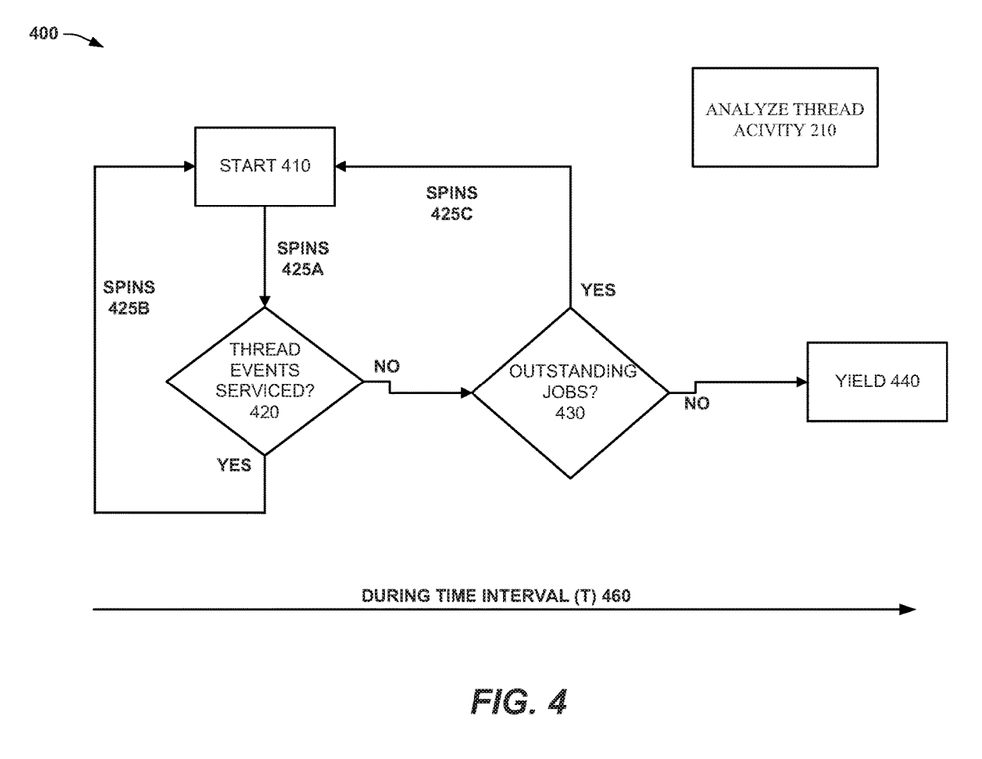
FIG. 4 illustrates an example flow diagram for a method that can facilitate the adaptive tuning of thread weights for multithreaded processors, in accordance with one or more embodiments.

FIG. 4 illustrates an example flow diagram for a method 400 that can facilitate the adaptive tuning of thread weights for multithreaded processors, in accordance with one or more embodiments. For purposes of brevity, description of like elements and/or processes employed in other embodiments is omitted.

The discussion of the flow diagram below illustrates the operation of a thread and the detection of events by thread activity analyzer 110, over a time interval (t) 460. In an example, at the start at block 410, a thread (e.g., thread 140A) without any history of operation, is assigned a task and spins 425A to begin an iteration of completing the assigned task. At the end of an iteration, at block 420, a check is made to determine whether there are thread events to be serviced for thread 140A. When there are thread events to be services, thread 140A can spins 425B, and returns to start. This event, e.g., spinning 425B as a result of events being present, is detected in one or more embodiments by thread activity analyzer 110. This loop can continue until no thread events are left to be serviced or until the threads get pre-empted by the scheduler.

At block 430, outstanding jobs for thread 140A are assessed. When there are outstanding jobs, thread 140A can spin 425B, and returns to start. This event, e.g., spinning 425C as a result of outstanding jobs being present, is also detected in one or more embodiments by thread activity analyzer 110. When no outstanding jobs for thread 140A are detected, thread 140A can yield 440 to other threads, with this event being detected by thread activity analyzer 110.

As included in the formulas below, in one or more embodiments, the events described above used to determine a likelihood for a particular event occurring. For example, for a time interval (T) 460, a total number of spins (s), and a total number of yields (y) 440:

Probability of spins:

$$P(s) = \frac{s}{s+y}$$

Probability of yields:

$$P(y) = \frac{y}{s+y}$$

These likelihoods can be used by one or more embodiments to determine a weight for thread 140A. For example, a non-limiting formula is included below that can determine a thread weight coefficient that can affect how a thread weight is determined. For example, for a time interval (T) 460, based on a total number of spins (s) 425A-C, and a total number of yields (y) 440, a thread weight coefficient (PC) can be determined:

(if $P(y)>0$) $PC=P(s)/P(y)$ (if $P(y)=0$) $PC=-1$ (if $P(s)=0$) $PC=0$

Based on the above determination of a thread weight coefficient (PC)

PC>1, thread is busy and is servicing jobs.
PC<1, thread is less busy and is servicing less jobs and idle most of the time during the last time interval.
PC=−1, thread is extremely busy servicing jobs.
PC=1, thread is busy and idle equally (Non-ideal case)

It should be noted that, a PC equivalent to 1 is the non-ideal case on a heavy input output systems or busy systems.

Figure 5:
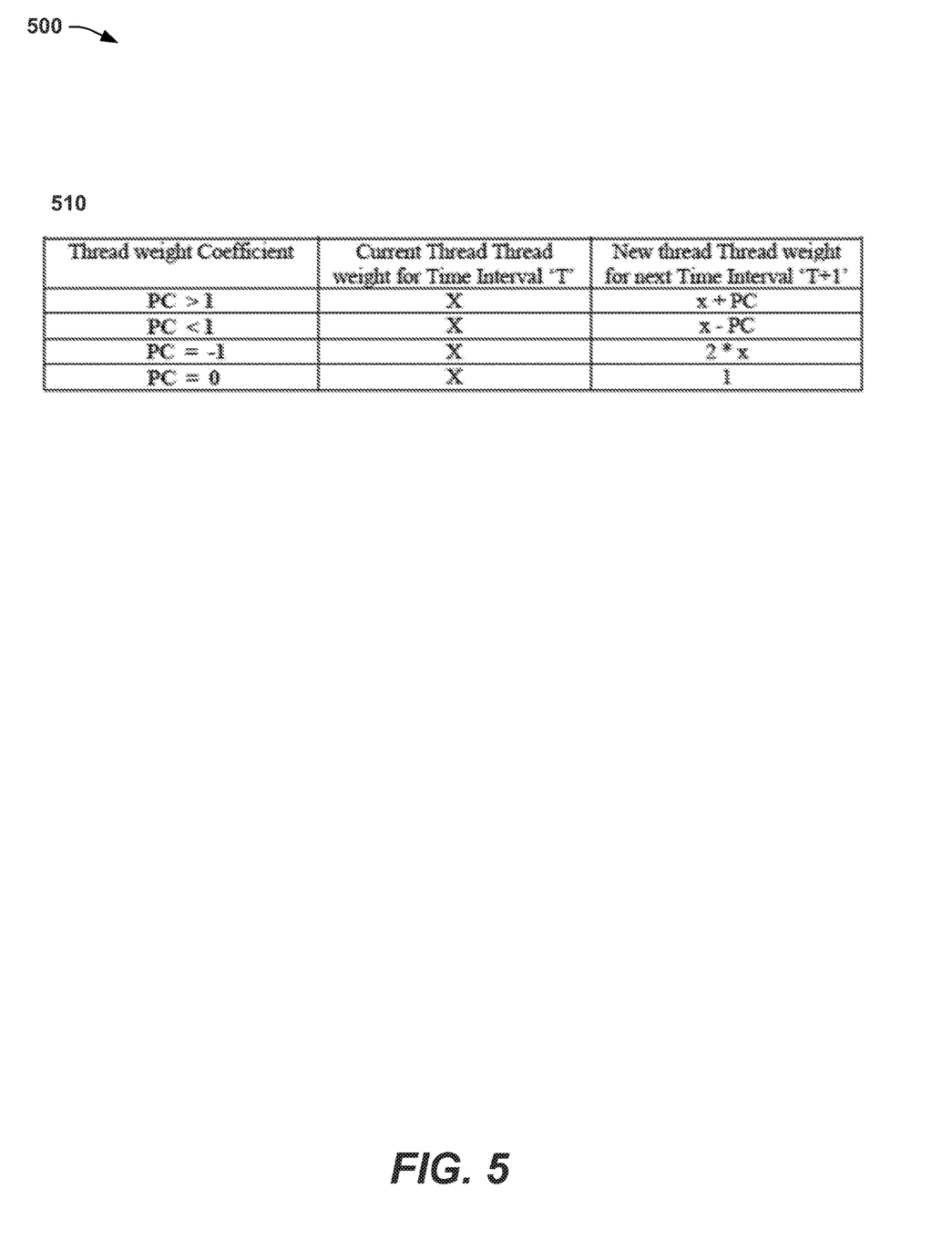
FIG. 5 depicts a non-limiting, example of a table that can provide different example formulas for different thread weight coefficients described above.

FIG. 5 depicts a non-limiting, example 500 of a table 510 that can provide different example formulas for different thread weight coefficients described above. For purposes of brevity, description of like elements and/or processes employed in other embodiments is omitted.

As shown, table 510 provides example formulas to determine a thread weight for different circumstances. In one or more embodiments, the thread weight coefficient (PC) described above can be indicative of the different circumstances. For example, as shown, in example circumstances where a thread is busy and frequently servicing jobs (PC>1), the new weight of the thread can be determined by adding the current thread weight to the determined weight coefficient. In different example circumstances where the thread is less busy and is servicing less jobs and idle most of the time during the last time interval (PC<1), the new weight of the thread can be determined by subtracting the determined weight coefficient from the current thread weight. In an example circumstance where the thread extremely busy and frequently servicing jobs (PC=−1, when probability of yields is zero), the weight of the thread can be determined by multiplying current thread weight by a multiplier, e.g., 2 as shown in FIG. 5. In example circumstances where the thread is idle and not servicing jobs (PC=0, when probability of spins is zero), the new thread weight can be set to a relatively low thread weight value, e.g., 1 as depicted in FIG. 5. In circumstances where a thread is servicing jobs at a substantially uniform pace and jobs are distributed evenly for every thread time slice, the probability of spins can be equal to the probability of yields (PC=1).

In additional embodiments, a maximum allowed thread value can be set for the values generated by the example formulas described above. In case the new thread weight for the next time interval exceeds the maximum allowed thread weight, then the new thread weight can be set to maximum the allowed limit.

It should be noted that the combination of the thread coefficients generated by probabilities and the thread weight changing formulas described above generally correspond to an approach that, when a thread is busy the new thread weight is increased from the old value, and when a thread is idle the new thread weight is decreased from the old value.

Based on combinations of the above-described approaches, on or more embodiments can load balance system wide CPU resources and avoid wasting CPU cycles, e.g., ensuring that heavily working threads are fed with enough of CPU resources to carry out assigned tasks, this resource allocation approach improving, in some circumstances, the overall performance of the system.

Figure 6:
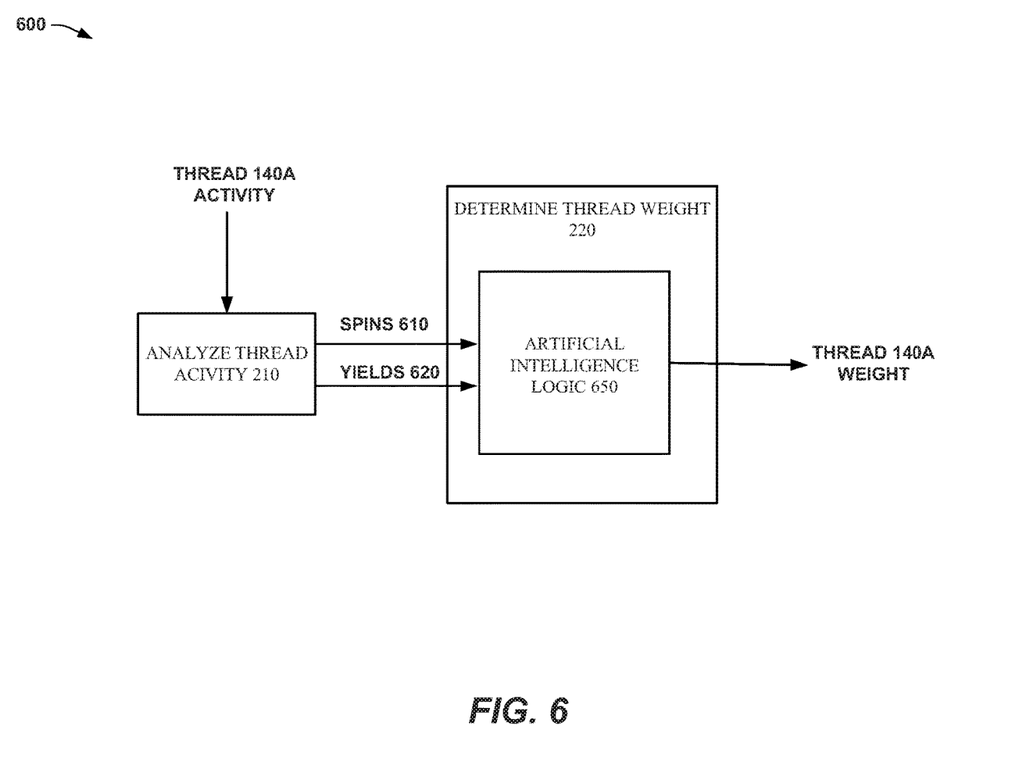
FIG. 6 illustrates a flow diagram of example processes that can facilitate the adaptive weighing the multi-threaded microprocessor threads by employing artificial intelligence logic, in accordance with one or more embodiments.

FIG. 6 illustrates a flow diagram 600 of example processes that can facilitate the adaptive weighing the multithreaded microprocessor threads by employing artificial intelligence logic, in accordance with one or more embodiments. For purposes of brevity, description of like elements and/or processes employed in other embodiments is omitted.

Like blocks 210 and 220 described above, FIG. 6 includes blocks 210 and 220 where thread activity can be analyzed and a thread weight can be determined. In an alternative or additional approach to the thread weight coefficient formulas described above with FIG. 4, in FIG. 6, a thread weight can be adaptively tuned based on artificial intelligence logic 650 applied to the activity analyzed by thread activity analyzer 110 in block 210.

One way that artificial intelligence or machine learning can assist the determination of a context of the vehicle or the driver for presentation is by using neural networks. One or more embodiments can employ one or more neural networks trained by data including, but not limited to spins and yields over intervals (e.g., analyzed by thread activity analyzer), the weights applied to threads (e.g., by thread weight component 120), the scheduling of threads (e.g., by scheduler 160), and the system performance based on these different factors. In one or more embodiments, one or more neural networks can be trained to estimate probability of spins and yields, e.g., by estimating probabilities of threads, then comparing to results. This probability can be used alternatively or additionally to the approaches described above to estimate probability.

Alternatively or additionally, one or more embodiments can also employ one or more neural networks to determine a weight based on an estimated probability. An example approach can compare system performance of one or more threads to the probability estimated for the threads, and the weights selected for the threads based on the estimated probability. One having skill in the relevant arts, given the descriptions herein, would appreciate that different types of artificial intelligence logic can be used to implement the approaches to adaptively weighting threads based on probability described above.

Figure 7:
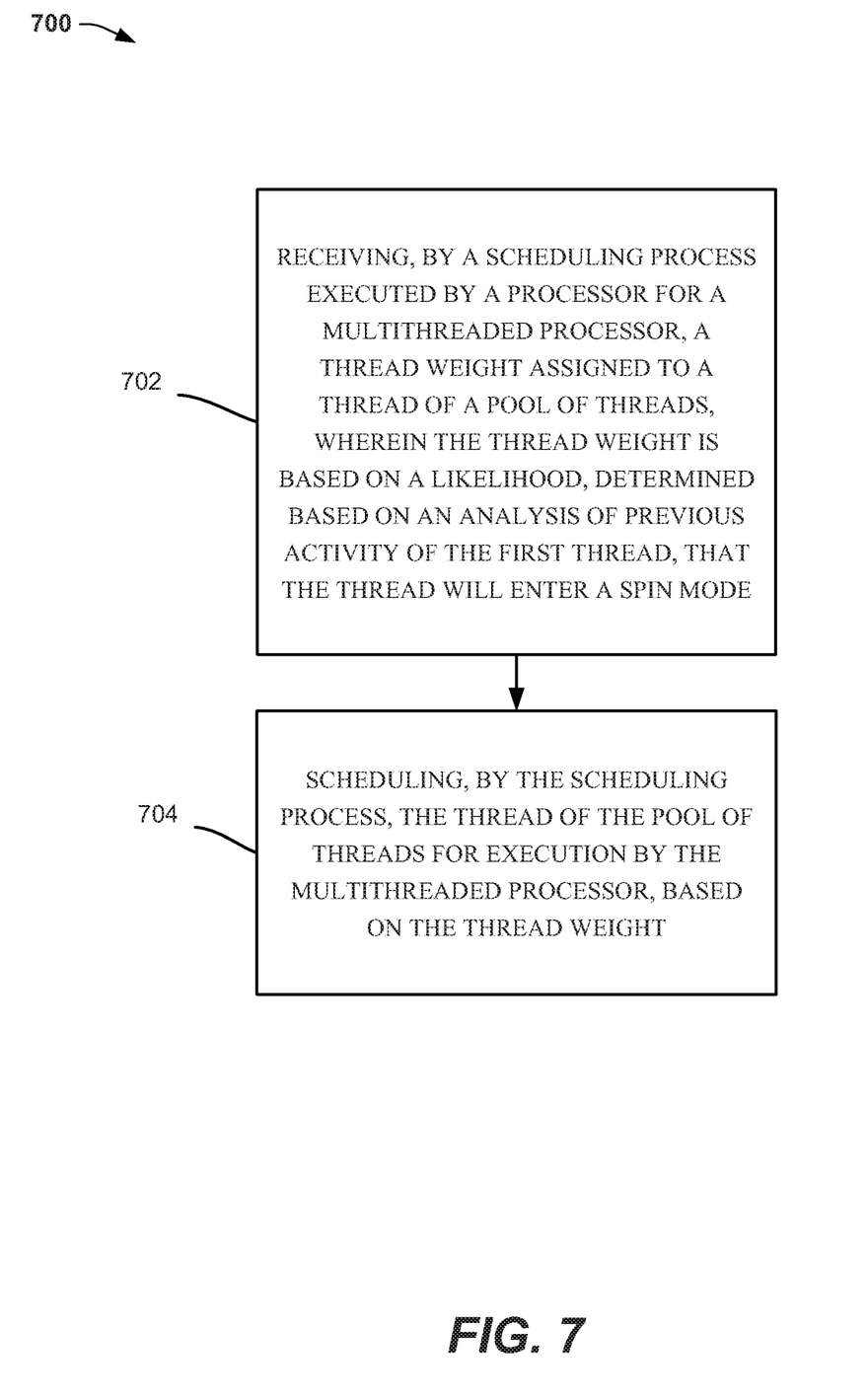
FIG. 7 illustrates an example flow diagram for a method that can facilitate adaptive tuning of thread weights for multithreaded processor, in accordance with one or more embodiments.

FIG. 7 illustrates an example flow diagram for a method 700 that can facilitate adaptive tuning of thread weights for multithreaded processor 130, in accordance with one or more embodiments. For purposes of brevity, description of like elements and/or processes employed in other embodiments is omitted.

At element 702, method 700 can comprise receiving, by a scheduling process (e.g., scheduler 160) executed by a processor 155 for multithreaded system 150 with a multithreaded processor 130, a thread weight assigned to a thread 140A of a pool of threads (e.g., thread pool 152), wherein the thread weight is based on a likelihood, determined based on an analysis of previous activity of the first thread, that the thread 140A will enter a spin mode.

At element 704, method 700 can comprise scheduling, by the scheduling process (e.g., scheduler 160), the thread 140A of the pool of threads (e.g., thread pool 152) for execution by the multithreaded processor 130, based on the thread weight.

Figure 8:
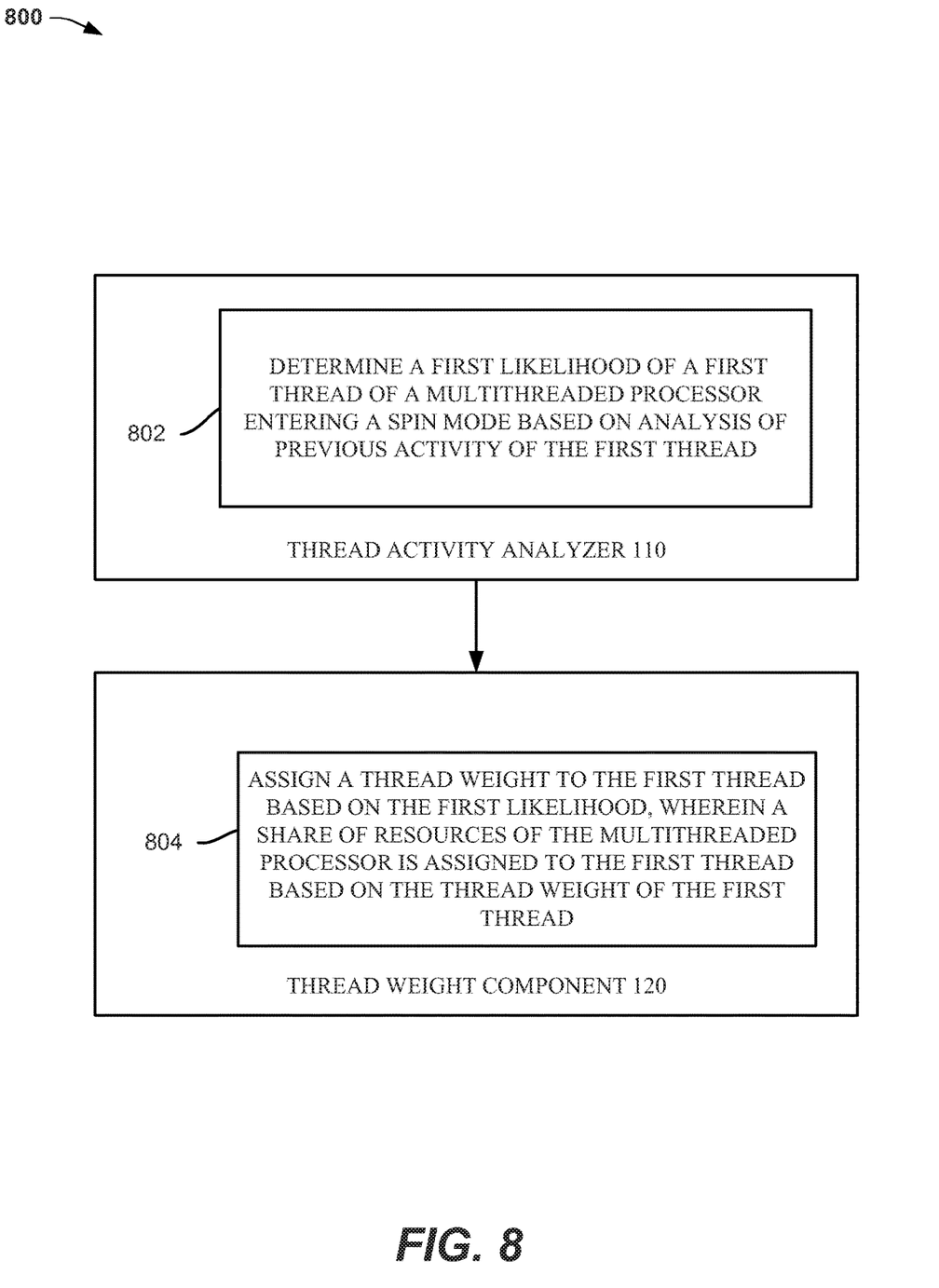
FIG. 8 is a flow diagram representing example operations of a system comprising a thread activity analyzer and thread weight component that can facilitate adaptive tuning of thread weights for multithreaded processors, in accordance with one or more embodiments.

FIG. 8 is a flow diagram 800 representing example operations of a system 150 comprising a thread activity analyzer 110 and thread weight component 120 that can facilitate adaptive tuning of thread weights for multithreaded processors 130, in accordance with one or more embodiments. For purposes of brevity, description of like elements and/or processes employed in other embodiments is omitted.

Thread activity analyzer 110 can be configured 802 to determine a first likelihood of a first thread 140A of a multithreaded processor 130 entering a spin mode based on analysis of previous activity of the first thread 140A.

Thread weight component 120 can be configured 804 to assign a thread weight to the first thread based on the first likelihood, wherein a share of resources of the multithreaded processor is assigned (e.g., by scheduler 160) to the first thread 140A based on the thread weight of the first thread.

Figure 9:
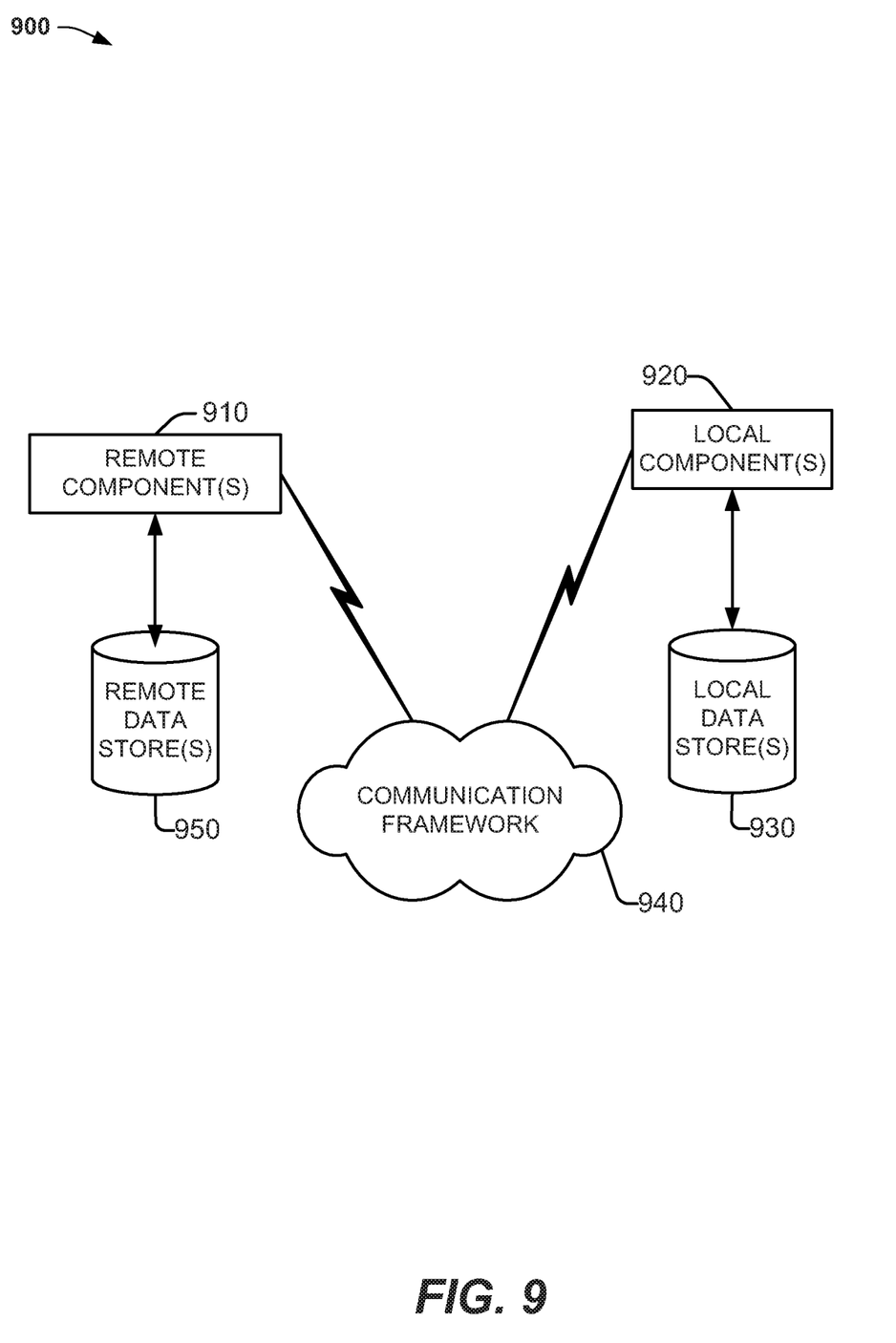
FIG. 9 depicts an example schematic block diagram of a computing environment with which the disclosed subject matter can interact.

FIG. 9 is a schematic block diagram of a computing environment 900 with which the disclosed subject matter can interact. The system 900 comprises one or more remote component(s) 910. The remote component(s) 910 can be hardware and/or software (e.g., threads, processes, computing devices). In some embodiments, remote component(s) 910 can be a distributed computer system, connected to a local automatic scaling component and/or programs that use the resources of a distributed computer system, via communication framework 940. Communication framework 940 can comprise wired network devices, wireless network devices, mobile devices, wearable devices, radio access network devices, gateway devices, femtocell devices, servers, etc.

The system 900 also comprises one or more local component(s) 920. The local component(s) 920 can be hardware and/or software (e.g., threads, processes, computing devices). In some embodiments, local component(s) 920 can comprise thread activity analyzer 110, thread weight component 120, and scheduler 160.

One possible communication between a remote component(s) 910 and a local component(s) 920 can be in the form of a data packet adapted to be transmitted between two or more computer processes. Another possible communication between a remote component(s) 910 and a local component(s) 920 can be in the form of circuit-switched data adapted to be transmitted between two or more computer processes in radio time slots. The system 900 comprises a communication framework 940 that can be employed to facilitate communications between the remote component(s) 910 and the local component(s) 920, and can comprise an air interface, e.g., Uu interface of a UMTS network, via a long-term evolution (LTE) network, etc. Remote component(s) 910 can be operably connected to one or more remote data store(s) 950, such as a hard drive, solid state drive, SIM card, device memory, etc., that can be employed to store information on the remote component(s) 910 side of communication framework 940. Similarly, local component(s) 920 can be operably connected to one or more local data store(s) 930, that can be employed to store information on the local component(s) 920 side of communication framework 940.

In order to provide a context for the various aspects of the disclosed subject matter, FIG. 8, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that performs particular tasks and/or implement particular abstract data types.

In the subject specification, terms such as "store," "storage," "data store," "data storage," "database," and substantially any other information storage component relevant to operation and functionality of a component, refer to "memory components," or entities embodied in a "memory" or components comprising the memory. It is noted that the memory components described herein can be either volatile memory or nonvolatile memory, or can comprise both volatile and nonvolatile memory, by way of illustration, and not limitation, volatile memory 1020 (see below), non-volatile memory 1022 (see below), disk storage 1024 (see below), and memory storage, e.g., local data store(s) 930 and remote data store(s) 950, see below. Further, nonvolatile memory can be included in read only memory, programmable read only memory, electrically programmable read only memory, electrically erasable read only memory, or flash memory. Volatile memory can comprise random access memory, which acts as external cache memory. By way of illustration and not limitation, random access memory is available in many forms such as synchronous random access memory, dynamic random access memory, synchronous dynamic random access memory, double data rate synchronous dynamic random access memory, enhanced synchronous dynamic random access memory, SynchLink dynamic random access memory, and direct Rambus random access memory. Additionally, the disclosed memory components of systems or methods herein are intended to comprise, without being limited to comprising, these and any other suitable types of memory.

Moreover, it is noted that the disclosed subject matter can be practiced with other computer system configurations, comprising single-processor or multiprocessor computer systems, mini-computing devices, mainframe computers, as well as personal computers, hand-held computing devices (e.g., personal digital assistant, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

Figure 10:
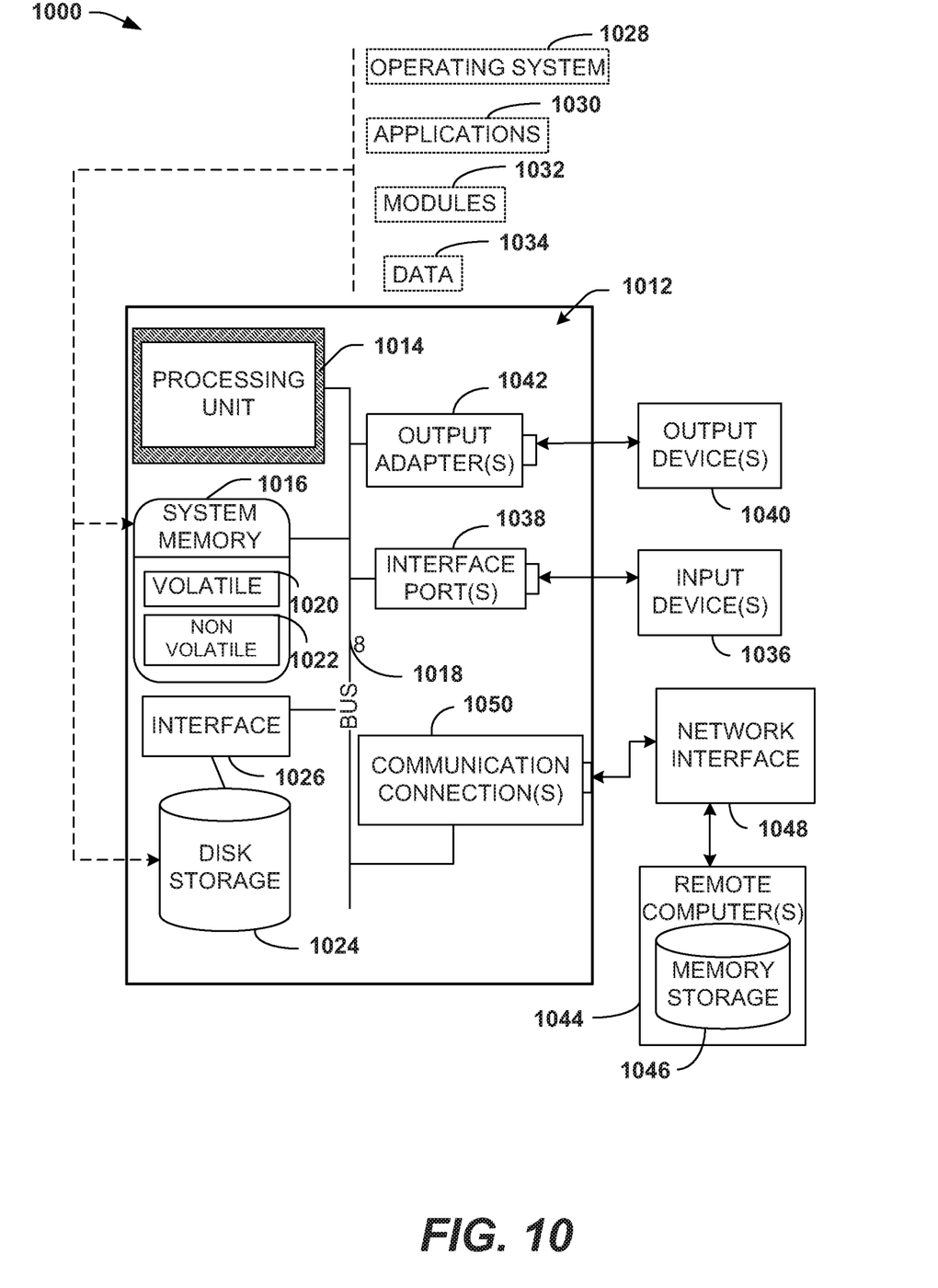
FIG. 10 illustrates an example block diagram of a computing system operable to execute the disclosed systems and methods in accordance with various aspects and implementations of the subject disclosure.

FIG. 10 illustrates a block diagram of a computing system 1000 operable to execute the disclosed systems and methods in accordance with one or more embodiments/implementations described herein. Computer 1012 can comprise a processing unit 1014, a system memory 1016, and a system bus 1018. System bus 1018 couples system components comprising, but not limited to, system memory 1016 to processing unit 1014. Processing unit 1014 can be any of various available processors. Dual microprocessors and other multiprocessor architectures also can be employed as processing unit 1014.

System bus 1018 can be any of several types of bus structure(s) comprising a memory bus or a memory controller, a peripheral bus or an external bus, and/or a local bus using any variety of available bus architectures comprising, but not limited to, industrial standard architecture, microchannel architecture, extended industrial standard architecture, intelligent drive electronics, video electronics standards association local bus, peripheral component interconnect, card bus, universal serial bus, advanced graphics port, personal computer memory card international association bus, Firewire (Institute of Electrical and Electronics Engineers 1394), and small computer systems interface.

System memory 1016 can comprise volatile memory 1020 and non-volatile memory 1022. A basic input/output system, containing routines to transfer information between elements within computer 1012, such as during start-up, can be stored in non-volatile memory 1022. By way of illustration, and not limitation, non-volatile memory 1022 can comprise read only memory, programmable read only memory, electrically programmable read only memory, electrically erasable read only memory, or flash memory. Volatile memory 1020 comprises read only memory, which acts as external cache memory. By way of illustration and not limitation, read only memory is available in many forms such as synchronous random access memory, dynamic read only memory, synchronous dynamic read only memory, double data rate synchronous dynamic read only memory, enhanced synchronous dynamic read only memory, SynchLink dynamic read only memory, Rambus direct read only memory, direct Rambus dynamic read only memory, and Rambus dynamic read only memory.

Computer 1012 can also comprise removable/non-removable, volatile/non-volatile computer storage media. FIG. 10 illustrates, for example, disk storage 1024. Disk storage 1024 comprises, but is not limited to, devices like a magnetic disk drive, floppy disk drive, tape drive, flash memory card, or memory stick. In addition, disk storage 1024 can comprise storage media separately or in combination with other storage media comprising, but not limited to, an optical disk drive such as a compact disk read only memory device, compact disk recordable drive, compact disk rewritable drive or a digital versatile disk read only memory. To facilitate connection of the disk storage 1024 to system bus 1018, a removable or non-removable interface is typically used, such as interface 1026.

Computing devices typically comprise a variety of media, which can comprise computer-readable storage media or communications media, which two terms are used herein differently from one another as follows.

Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, read only memory, programmable read only memory, electrically programmable read only memory, electrically erasable read only memory, flash memory or other memory technology, compact disk read only memory, digital versatile disk or other optical disk storage, magnetic cassettes, magnetic tape, magnetic disk storage or other magnetic storage devices, or other tangible media which can be used to store desired information. In this regard, the term "tangible" herein as may be applied to storage, memory or computer-readable media, is to be understood to exclude only propagating intangible signals per se as a modifier and does not relinquish coverage of all standard storage, memory or computer-readable media that are not only propagating intangible signals per se. In an aspect, tangible media can comprise non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium. As such, for example, a computer-readable medium can comprise executable instructions stored thereon that, in response to execution, can cause a system comprising a processor to perform operations, comprising determining a mapped cluster schema, altering the mapped cluster schema until a rule is satisfied, allocating storage space according to the mapped cluster schema, and enabling a data operation corresponding to the allocated storage space, as disclosed herein.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

It can be noted that FIG. 10 describes software that acts as an intermediary between users and computer resources described in a suitable operating environment, e.g., computing system 1000. Such software comprises an operating system 1028. Operating system 1028, which can be stored on disk storage 1024, acts to control and allocate resources of computer 1012. System applications 1030 take advantage of the management of resources by operating system 1028 through program modules 1032 and program data 1034 stored either in system memory 1016 or on disk storage 1024. It is to be noted that the disclosed subject matter can be implemented with various operating systems or combinations of operating systems.

A user can enter commands or information into computer 1012 through input device(s) 1036. In some embodiments, a user interface can allow entry of user preference information, etc., and can be embodied in a touch sensitive display panel, a mouse/pointer input to a graphical user interface (GUI), a command line controlled interface, etc., allowing a user to interact with computer 1012. Input devices 1036 comprise, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1014 through system bus 1018 by way of interface port(s) 1038. Interface port(s) 1038 comprise, for example, a serial port, a parallel port, a game port, a universal serial bus, an infrared port, a Bluetooth port, an IP port, or a logical port associated with a wireless service, etc. Output device(s) 1040 use some of the same type of ports as input device(s) 1036.

Thus, for example, a universal serial busport can be used to provide input to computer 1012 and to output information from computer 1012 to an output device 1040. Output adapter 1042 is provided to illustrate that there are some output devices 1040 like monitors, speakers, and printers, among other output devices 1040, which use special adapters. Output adapters 1042 comprise, by way of illustration and not limitation, video and sound cards that provide means of connection between output device 1040 and system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. Remote computer(s) 1044 can be a personal computer, a server, a router, a network PC, cloud storage, a cloud service, code executing in a cloud computing environment, a workstation, a microprocessor-based appliance, a peer device, or other common network node and the like, and typically comprises many or all of the elements described relative to computer 1012. A cloud computing environment, the cloud, or other similar terms can refer to computing that can share processing resources and data to one or more computer and/or other device(s) on an as needed basis to enable access to a shared pool of configurable computing resources that can be provisioned and released readily. Cloud computing and storage solutions can store and/or process data in third-party data centers which can leverage an economy of scale and can view accessing computing resources via a cloud service in a manner similar to a subscribing to an electric utility to access electrical energy, a telephone utility to access telephonic services, etc.

For purposes of brevity, only a memory storage device 1046 is illustrated with remote computer(s) 1044. Remote computer(s) 1044 is logically connected to computer 1012 through a network interface 1048 and then physically connected by way of communication connection 1050. Network interface 1048 encompasses wire and/or wireless communication networks such as local area networks and wide area networks. Local area network technologies comprise fiber distributed data interface, copper distributed data interface, Ethernet, Token Ring and the like. Wide area network technologies comprise, but are not limited to, point-to-point links, circuit-switching networks like integrated services digital networks and variations thereon, packet switching networks, and digital subscriber lines. As noted below, wireless technologies may be used in addition to or in place of the foregoing.

Communication connection(s) 1050 refer(s) to hardware/software employed to connect network interface 1048 to system bus 1018. While communication connection 1050 is shown for illustrative clarity inside computer 1012, it can also be external to computer 1012. The hardware/software for connection to network interface 1048 can comprise, for example, internal and external technologies such as modems, comprising regular telephone grade modems, cable modems and digital subscriber line modems, integrated services digital network adapters, and Ethernet cards.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

While the invention is susceptible to various modifications and alternative constructions, certain illustrated implementations thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the invention is not to be limited to any single implementation, but rather is to be construed in breadth, spirit and scope in accordance with the appended claims.

What is claimed is:

1. A system in a first security zone, comprising:
    a memory that stores computer executable components; and
    a processor that executes the computer executable components stored in the memory, wherein the computer executable components comprise:
        a thread activity analyzer to determine a first likelihood of a first thread of a multithreaded processor entering a spin mode based on analysis of previous activity of the first thread; and
        a thread weight component to assign a thread weight to the first thread based on the first likelihood, wherein a share of resources of the multithreaded processor is assigned to the first thread based on the thread weight of the first thread.

2. The system of claim 1, wherein the thread weight component assigns the thread weight to the first thread based on the first likelihood by a process comprising:
    selecting a thread weight coefficient based on the first likelihood; and
    selecting the thread weight to assign to the first thread based on a previous thread weight of the first thread and the thread weight coefficient.

3. The system of claim 1, wherein the first thread entering the spin mode comprises the first thread entering the spin mode after the first thread completes a processor task of the multithreaded processor.

4. The system of claim 1, wherein the first likelihood being determined is based on the previous activity comprising a first number of spin mode instances entered by the first thread over an interval of time.

5. The system of claim 4, wherein the thread activity analyzer further determines a second likelihood based on a second number of sleep mode instances entered by the first thread over the interval of time, and wherein the thread weight to the first thread being assigned is further based on the second likelihood.

6. The system of claim 4, wherein the thread weight being assigned comprises assigning the thread weight as a function of a ratio of the first likelihood to the second likelihood.

7. The system of claim 1, wherein the resources assigned to the first thread are first resources, and wherein the thread weight component further allocates a second resource to a second thread based on the thread weight of the first thread.

8. The system of claim 1, wherein the computer executable components further comprise one or more neural networks optimized based on previously determined likelihoods of the first thread of the multithreaded processor entering the spin mode, and the analysis of previous activity of the first thread, and wherein the thread activity analyzer determines the first likelihood based on the one or more neural networks.

9. The system of claim 1, wherein the computer executable components further comprise one or more neural networks optimized based on previous performance of the multithreaded processor executing the first thread, and previous thread weights applied to the first thread, and wherein the thread weight component assigns the thread weight to the first thread further based on the one or more neural networks.

10. A method, comprising:
receiving, by a scheduling process executed by a processor for a multithreaded processor, a thread weight assigned to a thread of a pool of threads, wherein the thread weight is based on a likelihood, determined based on an analysis of a previous activity of the thread, that the thread will enter a spin mode; and
scheduling, by the scheduling process, the thread of the pool of threads for execution by the multithreaded processor, based on the thread weight.

11. The method of claim 10, wherein the thread entering the spin mode comprises the thread entering the spin mode after the thread completes a processor task of the multithreaded processor.

12. The method of claim 10, wherein the likelihood is determined based on a number of spin mode instances entered by the first thread over an interval of time.

13. The method of claim 10, wherein the thread weight is determined based on the likelihood by a process comprising:
selecting a thread weight coefficient based on the likelihood; and
selecting the thread weight to assign to the thread based on a previous thread weight of the thread and the thread weight coefficient.

14. The method of claim 10, wherein the likelihood is determined based on one or more neural networks, the one or more neural networks being optimized based on previously determined likelihoods of the thread entering the spin mode.

15. The method of claim 10, wherein the determined likelihood is determined based on one or more neural networks, the one or more neural networks being optimized based on previously determined likelihoods of the thread entering the spin mode.

16. The method of claim 10, wherein the thread weight is assigned to the thread based on one or more neural networks, the one or more neural networks being optimized based previous performance of the multithreaded processor executing the thread, and previous thread weights applied to the thread.

17. A machine-readable storage medium comprising executable instructions that, when executed by a processor, facilitate performance of operations, the operations comprising:
determining a likelihood of a thread of a multithreaded processor entering a spin mode based on analysis of previous activity of the thread; and
assigning a thread weight to first thread based on the likelihood, wherein a share of resources of the multithreaded processor is assigned to the thread based on the thread weight of the thread.

18. The machine-readable storage medium of claim 17, wherein the thread weight is assigned to the thread based on the likelihood by:
selecting the thread weight coefficient based on the likelihood; and
selecting the thread weight to assign to the thread based on a previous thread weight of the thread and the thread weight coefficient.

19. The machine-readable storage medium of claim 17, wherein the thread entering the spin mode comprises the thread entering the spin mode after the thread completes a processor task of the multithreaded processor.

20. The machine-readable storage medium of claim 17, wherein the likelihood is determined based on one or more neural networks, the one or more neural networks being optimized based on previously determined likelihoods of the thread entering the spin mode.

* * * * *